Aug. 6, 1957     J. F. PAULUCCI     2,801,929
METHOD OF MAKING CANNED CHINESE FOOD
Filed May 5, 1954
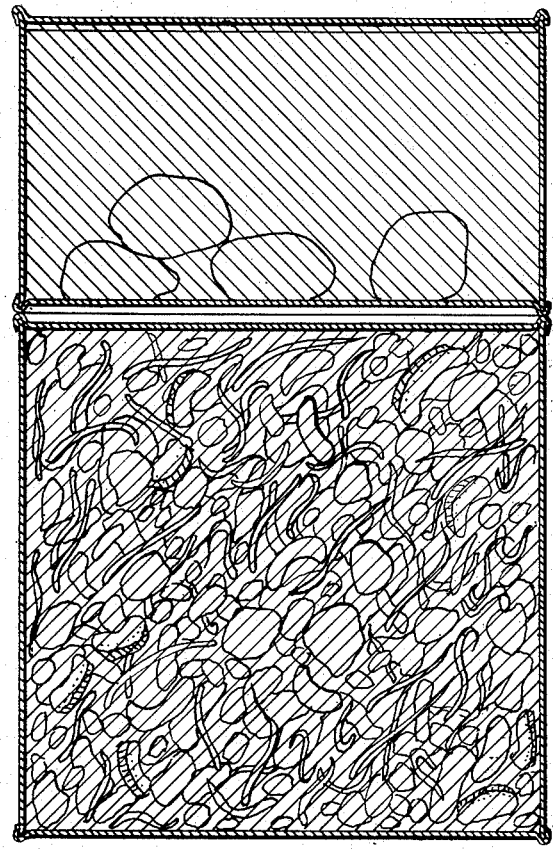
FIG. I
INVENTOR.
JENO F. PAULUCCI
BY
AGENT

United States Patent Office 2,801,929
Patented Aug. 6, 1957

2,801,929

METHOD OF MAKING CANNED CHINESE FOOD

Jeno F. Paulucci, Duluth, Minn.

Application May 5, 1954, Serial No. 427,699

1 Claim. (Cl. 99—182)

The present invention relates to canned food products that are packaged for consumption at a future time, and more particularly canned Chinese food, such as chow mein and the like, and its method of manufacture, wherein the vegetable components and sauce components are prepared and canned separately and are combined only by the consumer when ready for use.

Chinese food of the character of chow mein or the like consists of a plurality of separate vegetables, such as celery, bean sprouts, water chestnuts, mushrooms, onions, bamboo shoots, peppers and the like, which are then mixed with a sauce or broth, such as, for example, chicken broth. The normal and customary commercial manufacture of Chinese food of this character is to combine the sauce and all of the vegetables and cook them together until done. The cooked product containing all of the aforementioned ingredients is then canned and the can sealed. Following this operation the sealed can is then placed in a retort where it is subjected to a sterilization operation, usually for a period of about eight-five minutes or the like. This procedure is required by law. The canned product is then sold in the usual commercial channels for ultimate consumption by a purchaser.

Canned Chinese food prepared in the aforesaid conventional manner is not particularly appetizing or palatable, nor does it bear any close resemblance to its homemade counterpart. A principal reason for this fact is the customary operation of cooking all of the ingredients together. The ingredients when cooked together cook down and become soft and mushy with the fluids and coloring of the ingredients running together. Moreover, caramelization of sugars present in the food gives it an overcooked taste, and the product becomes somewhat unappetizing and dark looking in appearance. A principal reason for these undesirable characteristics encountered with prior canned Chinese foods is that virtually all of the vegetable components present in Chinese foods are what is termed green vegetables. Such vegetables are much more palatable, appetizing, and pleasing to the eye of a potential customer in a cooked state when they retain some degree of their initial appearance prior to cooking, and particularly when they retain some degree of crispness in their cooked state. This is incapable of attainment with present day Chinese food prepared in the conventional manner, since the cooking of the broth with the vegetables results in the vegetables losing their initial appearance and becoming extremely soft with no degree of their original crisp state present. It should also be pointed out that with the conventional Chinese food, additional cooking or a warming operation is performed by the consumer which does not in any way restore the appearance of the canned product or restore any crispness to the cooked vegetables, or aid in the texture of the product.

There has been a long search and much effort expended by the food industry to develop a preserved Chinese food product which could be canned and still retain as much as possible of the original texture and flavor and individual distinctiveness of the ingredients. However, to date, there is no Chinese food product available which fulfills the need for improved canned food products which resemble to any degree their homemade counterparts.

It is therefore one of the principal objects of this invention to provide improved preserved Chinese food products having the desired characteristics of homemade food products relative to taste, texture, individual flavor or ingredients, coloring, and the like, of the ingredients.

Another object is to provide such a food product whih is capable of being sterilized without serious damage to the texture, coloring, flavor and the like of the product.

Another object is to provide such a product which is simple to prepare for consumption once the package is opened.

Another object is to provide a special seasoning arrangement for a product of the type in question which will expedite the production and result in improved quality of the product.

A still further object is to provide as a new article of manufacture a single unit having the vegetable component and broth components packaged separately and contained within the unit for combining by the consumer.

These and other objects and advantages of my invention will become more apparent as the description proceeds.

In the accompanying drawing forming a part of this application:

The figure is a sectional view through a canned product made in accordance with my invention.

In the preparation of my improved Chinese food product, I employ procedures which are materially different than conventional procedures for packaging similar products for market. The standard or conventional procedure for preparing canned Chinese food products, such as chow mein and the like, call for cooking all of the ingredients together before they are canned.

My procedure, by comparision, includes the separate preparation of the ingredients which are not united until they are to be heated for consumption. I first cook the meat in a kettle to get a broth and add seasoning, such as salt, pepper and the like, and possibly starch to thicken the broth. The broth or sauce is over-seasoned, that is, an excessive amount of seasoning is put in the sauce as compared with its volume, the reason for which will become apparent hereinafter. The sauce or broth, which may or may not include meat, is then packaged separate from the remaining ingredients of the product. The sauce is sealed in a separate can and the canned sauce is then sterilized by being placed in a retort for about eighty-five minutes at 240° F., or sufficient time, in accordance with the standards established by the National Canners' Association, which require that canned products be heated at a predetermined temperature for a given period of time so that they are sterilized through to the geometric center of the can. The canned sauce is then ready for labeling, storage, and open consumption, though it is not suitable for consumption alone for it is over-seasoned, as above stated, and has a relatively small amount of solids such as meat therein.

The vegetables, such as celery, bean sprouts, water chestnuts, mushrooms, onions, peppers, or the like, are treated differently than the conventional treatment they would receive in being prepared for market in the canned state. Conventional procedure is to place the vegetables in with the sauce and to cook the ingredients together for a predetermined length of time. This procedure results in the vegetables boiling down and becoming soft and mushy. The flavors and colors of the vegetables run together and caramelization of sugars usually takes place. The vegetables lose their crispness as well.

In my invention, the vegetables are put into the can in a raw or substantially raw condition and are sealed in the can in this condition. The vegetables may be packed in water, or they may be packed in a vacuum in the can. The canned vegetables, be they packed in water or in a vacuum, are then placed in a retort for sterilization as is the case with the sauce; however, the temperature and length of sterilization process is usually less for vegetables packed in this manner than it is for sauce and meat. Therefore, the vegetables are cooked sufficiently for the purpose intended during the sterilization process, and no separate cooking operation is required. The vegetables thus canned are not suitable for separate consumption without additions being made thereto for the vegetables are canned in an unseasoned condition. The seasoning for the vegetables is placed in the sauce when it is cooked and the sauce is over-seasoned so that the vegetables will pick up their seasoning from the sauce when the two are combined and heated for consumption. The unseasoned vegetables maintain their color, crispness and texture much better than seasoned vegetables do, and the product, when consumed, has a more natural and fresh texture and taste and appearance.

The vegetables and the sauce are preferably packed in cans of the same diameter whereby the cans may be placed in end-to-end relationship and united for sale as a single package. The cans may be wrapped in a common label, or may be labeled separately.

The canned Chinese food products above described are simply and quickly prepared for consumption. It is merely necessary to place the sauce and the vegetables in a double-boiler, or the like, for heating to the desired temperature, stirring the sauce and the vegetables together as they are heated to unite same to level off the seasoning between the sauce and the vegetables, and to secure uniform heating and mixing of the product.

Having thus described my invention, what I claim is:

A method of preparing a Chinese food package which comprises, placing substantially raw, unseasoned Chinese food vegetables in a can, sealing the can while the vegetables are in the unseasoned and substantially raw state, sterilizing the can containing the vegetables which are unseasoned and substantially raw whereby they maintain their individual crispness and taste, preparing a separate, cooked sauce for the Chinese food vegetables, seasoning the sauce to an extent to provide substantially all the seasoning for both the sauce and the vegetables when the two are admixed, canning and sterilizing the sauce, and then packaging the sauce and vegetables together for sale as a single unit.

References Cited in the file of this patent

UNITED STATES PATENTS

| | | |
|---|---|---|
| 1,889,882 | Woods | Dec. 6, 1932 |
| 1,983,685 | Townsley | Dec. 11, 1934 |
| 2,204,784 | Abrams | June 18, 1940 |
| 2,211,816 | Heise | Aug. 20, 1940 |
| 2,271,156 | Walker | Jan. 27, 1942 |
| 2,424,536 | Mayer et al. | July 22, 1947 |
| 2,469,204 | Peters | May 3, 1949 |

OTHER REFERENCES

"Quick Frozen Foods," December 1950, page 66.